United States Patent [19]
Oros

[11] Patent Number: 5,485,348
[45] Date of Patent: Jan. 16, 1996

[54] MOUNTING ASSEMBLY FOR COMPUTER FLOPPY DRIVE REQUIRING NO TOOL FOR REMOVAL FROM COMPUTER

[75] Inventor: Donald L. Oros, Solon, Ohio

[73] Assignee: Elsag International N.V., Netherlands

[21] Appl. No.: 185,196

[22] Filed: Jan. 24, 1994

[51] Int. Cl.$^6$ ............... G06F 1/16; H05K 7/14; G12B 9/04
[52] U.S. Cl. ............ 361/685; 248/27.3; 361/727
[58] Field of Search ............ 248/27.3; 439/928; 312/223.2; 364/708.1; 360/137; 361/685, 724–727

[56] References Cited

U.S. PATENT DOCUMENTS

| | | | |
|---|---|---|---|
| 4,688,131 | 8/1987 | Noda et al. | 360/137 |
| 4,941,841 | 7/1990 | Darden et al. | 361/685 |
| 5,142,445 | 8/1992 | Sorensen et al. | 361/726 |
| 5,169,218 | 12/1992 | Chu | 312/223.2 |

OTHER PUBLICATIONS

IBM Technical Disclosure Bulletin, vol. 28, No. 12, May 1986; pp. 5519–5521; "Spring–Loaded File Rails", copy in 360–137.

Primary Examiner—Michael W. Phillips
Attorney, Agent, or Firm—Vytas R. Matas

[57] ABSTRACT

A computer floppy drive mounting assembly is made to be slidably removable from a slide casing assembly located proximately to an open slot on the front of the computer without the use of any by allowing the drive mounting assembly to have a slotted portion near the front which fits over the edge of the open slot to hold the floppy drive in the computer and which when lifted over the edge allows easy removal of the floppy drive to provide easy access to the computer fuses inside the computer to allow them to be serviced and or replaced by the computer operator.

12 Claims, 4 Drawing Sheets

5,485,348

MOUNTING ASSEMBLY FOR COMPUTER FLOPPY DRIVE REQUIRING NO TOOL FOR REMOVAL FROM COMPUTER

BACKGROUND OF THE INVENTION

1. Field of the Invention

The present invention relates to computer drive mounting assemblies generally and particularly to disk drive mounting assemblies which are easily removable by the computer operator without the use of any tools.

2. Description of the Prior Art

Computer floppy or disk mounting assemblies are known whereby such a disk drive may be serviced or replaced by the operator removing the external case of the computer to thereby provide access to the drive assembly. This operation usually requires tools such as screwdrivers, etc. The drive assembly is also usually fastened in some manner to the frame of the computer and again tools must be used to remove the drive from the frame to service or replace same.

In some instances the disk drive is removable directly from the face of the console without removing the outer case of the computer by removing a front panel. However, the panel retaining the disk drive requires tools to remove the panel to allow access to the drive which is usually fastened to framing within the computer and tools are required to remove the drive therefrom.

Additionally, the disk drive is usually located proximately to certain auxiliary ports used for computer devices like mice, auxiliary keyboards, etc. These auxiliary devices are usually fused and these fuses may be replaced when necessary only by removing a back panel of the computer or the entire case using tools such as screwdrivers etc.

Because of the tiresome nature of the aforementioned drive and fuse replacement and/or service, the industry sorely needed a computer disk drive that could be slidably removed by a computer operator from the computer console without using any tools. Similarly a computer disk drive was needed that when removed would provide access to fuses used to fuse auxiliary computer ports thus allowing simple disk drive service and/or replacement of computer port fuses.

SUMMARY OF THE INVENTION

The applicant solves the aforementioned problems associated with prior art devices as well as others by providing a computer disk drive that is easily removed without the use of any tools and which when removed provides access to fuses associated with certain auxiliary ports used by the computer.

To accomplish this the applicant provides a computer drive retaining assembly which is slidably located within a pressure loading slide casing assembly. The drive when removed from the casing assembly by the operator overcoming the pressure fit provides an access area through the open bottom of the casing assembly to the auxiliary ports located proximately to the slide casing assembly for replacing the port fuses located therein.

In view of the foregoing it will be seen that one aspect of the present invention is to provide a computer disk drive assembly that is easily removed from the computer without the use of any tools.

Another aspect of the present invention is to provide a computer disk drive that when removed from the face of the computer console will provide an enlarged access port for replacing computer fuses there through.

Yet another aspect of the present inventions is to provide a panel for mounting the disk drive and auxiliary ports thereto which will be covered by a swinging door plate.

These and other aspects of the present invention will be more fully understood after a review of the following description of the preferred embodiment when considered in conjunction with the appended drawings.

DESCRIPTION OF THE PREFERRED EMBODIMENTS

Figure 2:
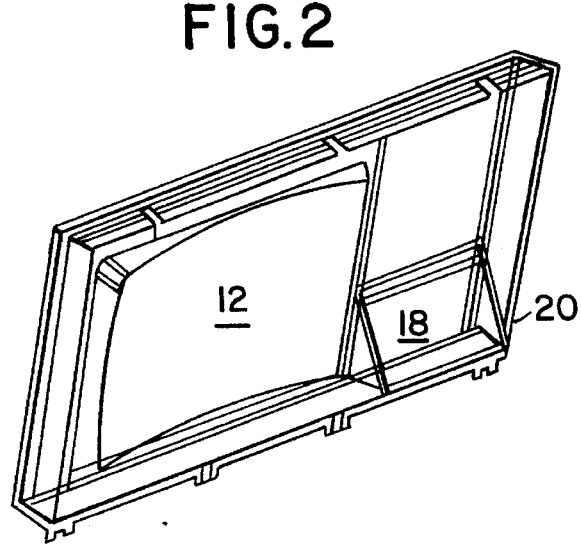
FIG. 2 is an isometric view of the monitor and drive mounting assembly of FIG. 1.
Figure 1:
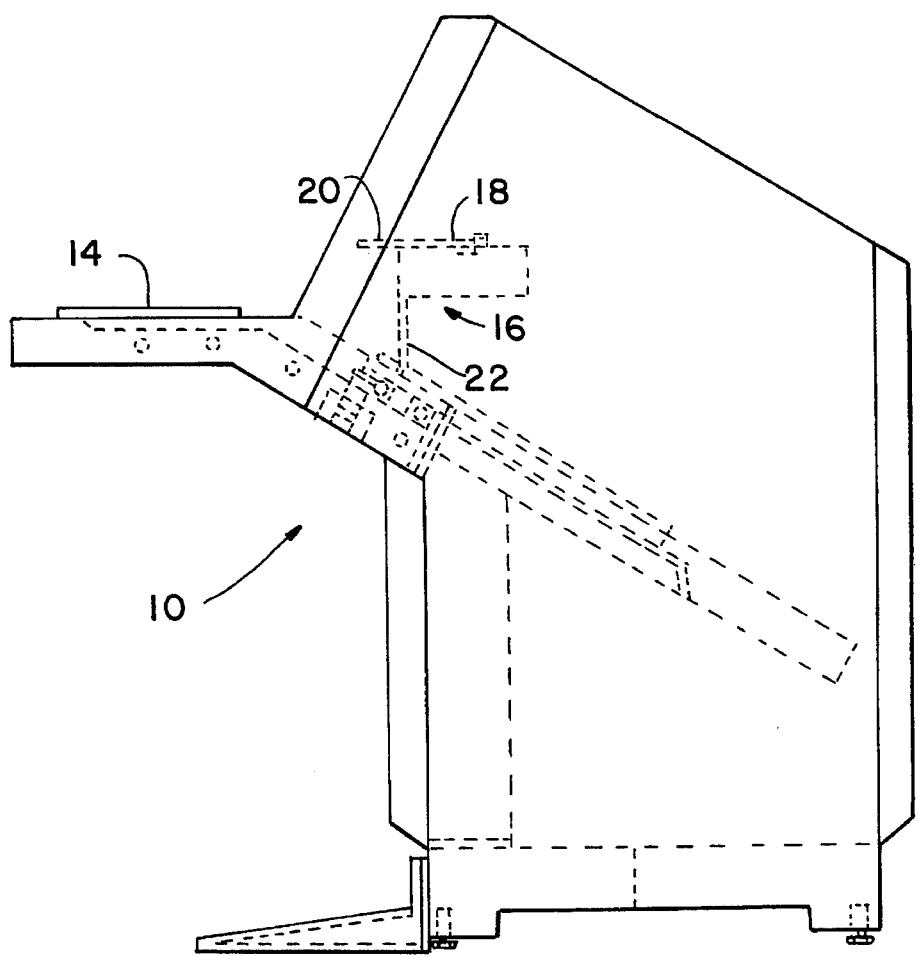
FIG. 1 is a side view of a computer console incorporating the drive mounting assembly of the present invention.
Figure 3:
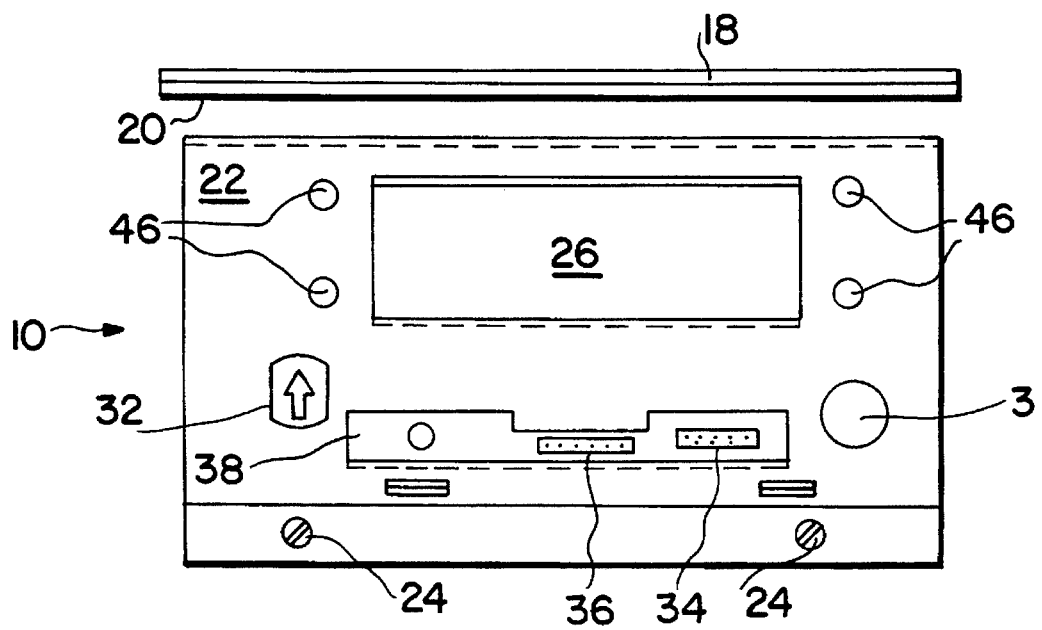
FIG. 3 is an expanded front view of the front panel of the mounting assembly shown in FIG. 1.

Turning now to the drawings where the showings are for purposes of describing a preferred embodiment of the invention and are not intended to limit the invention thereto, FIGS. 1. and 2. show a computer console assembly 10 normally utilized as part of a distributed process control system. The computer assembly 10 has a monitor 12 for displaying control inputs provided by an operator keyboard 14 or programs and data inputted to the hard drive (not shown) of the computer assembly 10 through a uniquely mounted floppy drive assembly 16.

The floppy drive mounting assembly 16 is located on one side of the monitor 12 and at a right angle to the keyboard 14 to allow easy operator access. The drive assembly is normally covered by a door panel 18 having a lip section 20 by which the operator may swing the door panel 18 away from the console assembly 10 to a position perpendicular to the keyboard 14. The door panel may then be inserted into the console assembly 10 to expose the drive assembly 16.

Figure 5:
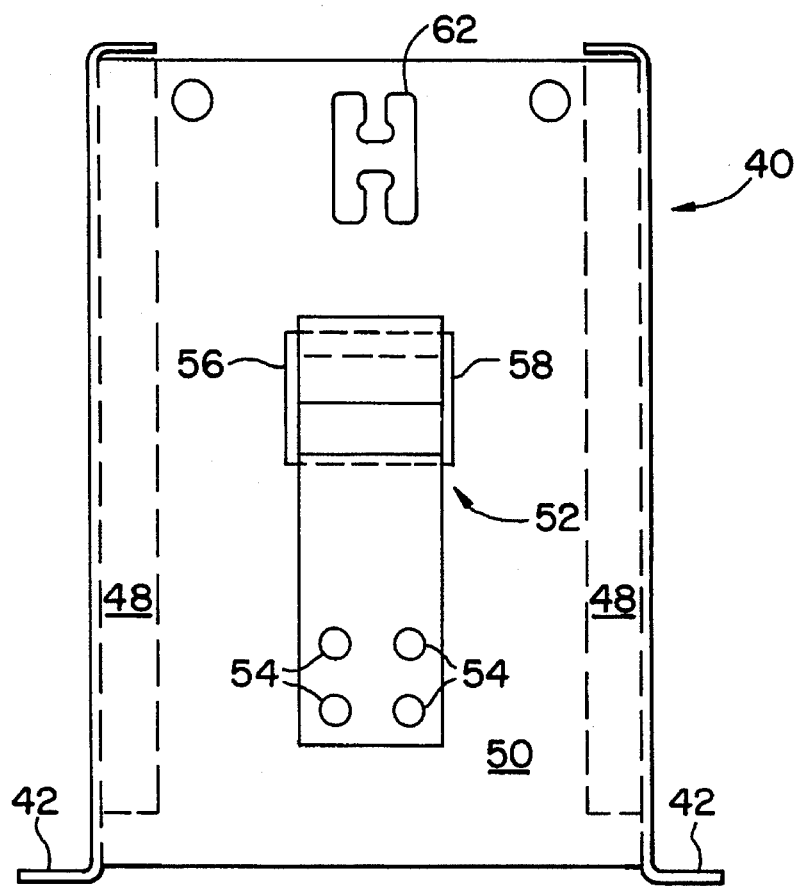
FIG. 5 is a top view of the slide casing assembly of FIG. 4.
Figure 6:
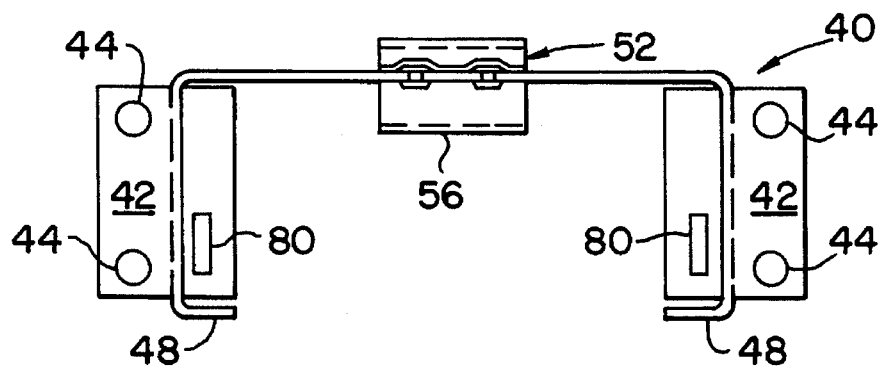
FIG. 6 is a front view of the slide casing assembly of FIG. 4.
Figure 6A:
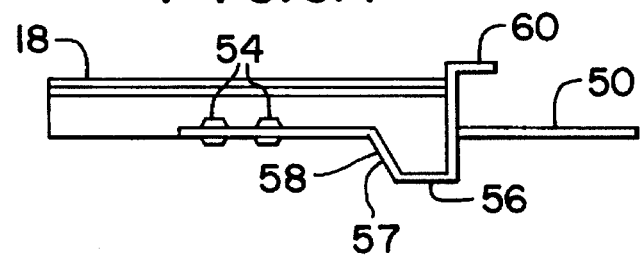
FIG. 6a is a side view of the leaf spring assembly of the slide casing of FIG. 6.
Figure 7:
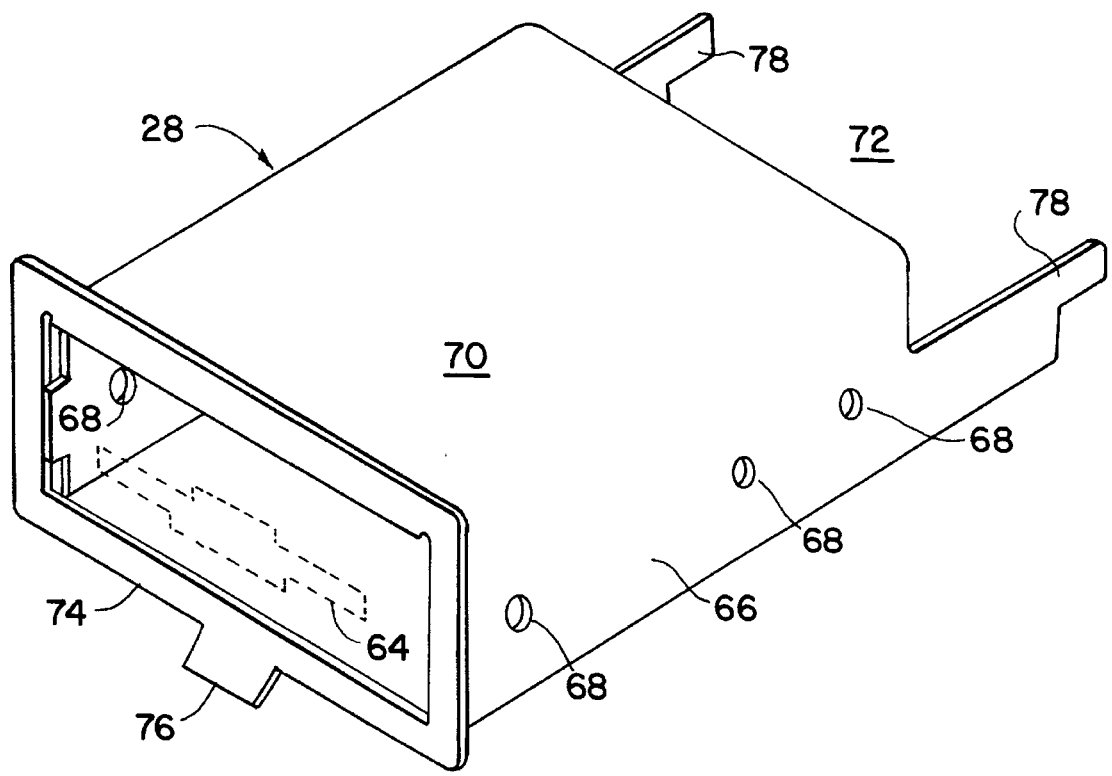
FIG. 7 is an isometric view of the drive retaining assembly shown mounted to the slide assembly in FIG. 1.
Figure 8:
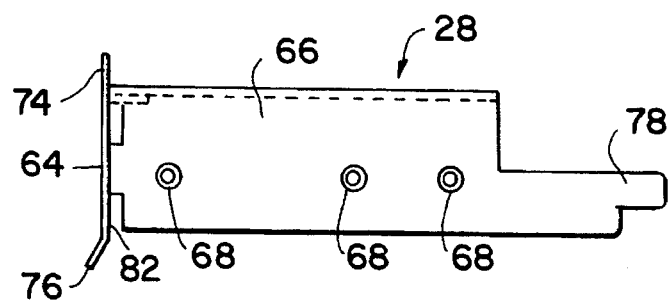
FIG. 8 is a side view of the drive retaining assembly shown in FIG. 7.

As may be best seen with particular reference to FIGS. 3–8, the floppy drive mounting assembly 16 has a front panel 22 that is mounted to the console assembly 10 by screws 24. The front panel 22 has an opening 26 for slidably inserting a floppy drive retaining assembly 28 as seen in FIGS. 7–8. Additionally, the front panel 22 has an opening 30 for retaining a plug for plugging an auxiliary keyboard (not shown) into the console assembly 10 in a well known manner. Located on the other side of the front panel 22 is a three position switch 32 used to switch the console assembly from the OFF position to either the TUNE or CONFIGURE positions. Located between the switch 32 and the auxiliary keyboard plug 30 is a series of electronic peripheral ports. These include a mouse/trackball port 34, and auxiliary port 36 and a membrane keyboard plug 38. Each of these ports 34, 36, 38, is individually fused and normal access to these fuses is had by removing a back panel of the console assembly 10. However, the proximity of these ports 34, 36, 38, to the opening 26 for sliding the drive retaining assembly 28 over the top of these ports 34, 36, 38, allows the operator to reach into the opening 26 to replace fuses whenever the drive retaining assembly 28 is removed from the front panel 22.

Figure 4:
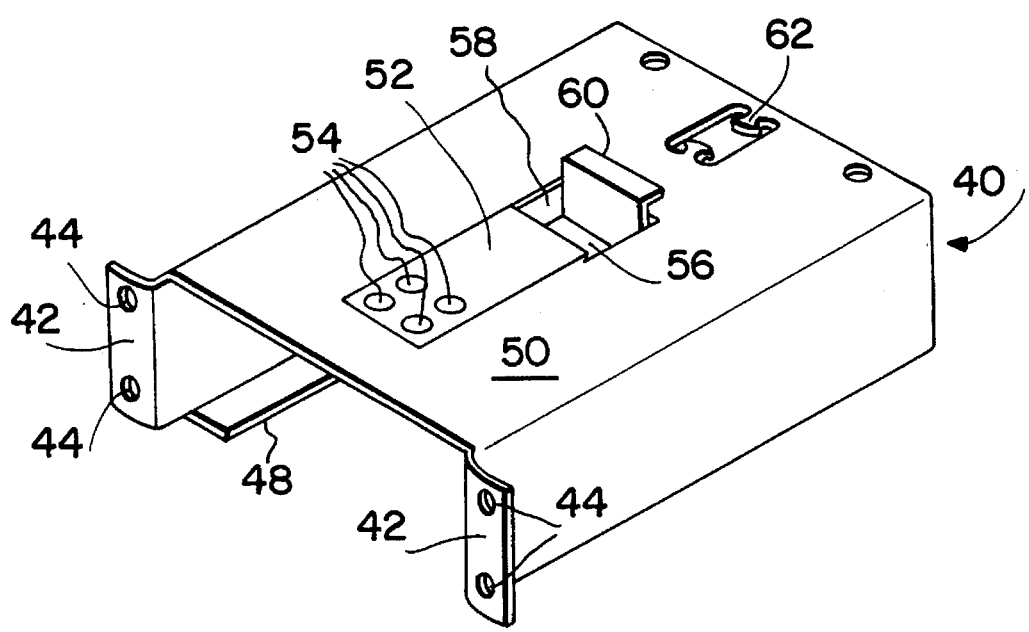
FIG. 4 is an isometric view of the slide casing assembly of the mounting assembly shown in FIG. 1.

With particular reference to FIGS. 4–6 it will be seen that a slide casing assembly 40 is mounted to the front panel 22 to facilitate the sliding of the drive retaining assembly 28 into and out of the opening 26 of the front panel 22 to leave the bottom of the opening 26 open to allow access to the mentioned fuses of the ports 34, 36, 38.

The slide casing assembly 40 has a pair of front flanges 42 with openings 44 formed to align with similar openings 46 on the front panel 22 to allow the slide casing assembly 40 to be rigidly retained to the front panel 22 by known means such as nuts and bolts or screws. The bottom of the slide casing assembly 40 is open with flanged ends 48 for forming slidable tracks for the drive retaining assembly 28. The top portion 50 of the slide casing assembly 40 has a leaf spring assembly 52 mounted thereto by fasteners 54 such as rivets, screws, nuts and bolts, or any other known fasteners to leave a depressed portion 56 of the spring assembly through an aperture 58 in the top portion 50. The depressed portion 56 terminates in an L-shaped end portion 60 having the leg of the L resting on the edge of the aperture 58. The front of the leaf spring assembly 52 has a tapered portion 57 allowing the easy insertion of the drive retaining assembly 28 into the slide casing assembly 40 without getting it caught against the leaf spring assembly. At the end of the slide casing assembly 40 is an H shaped opening 62 used to thread drive cables there through and connect them to the drive mounted in the assembly 28 so that they may be tied with a TY-WRAP cable retainer to provide strain relief to the drive cables.

The drive retaining assembly 28 of FIGS. 7–8 is sized to have a normal floppy drive assembly located therein so as to have a disk slot 64, shown in dotted lines, facing the front of the assembly 28. The body of the drive is retained inside a U-shaped case 66 of the assembly 28 by fastening with known fasteners through side apertures 68 along the sides of the U-shaped case 66. The end of the drive is located at an end of a top portion 70 of the U-shaped case 66 allowing the drive cables to be accessibly located at an open end 72 of the case 66. The front of the assembly 28 has an extended frame 74 with a tab 76 forwardly extending there from to allow an operator to grasp the assembly 28 and slide it along the flanges 48 into the slide casing assembly 40 until the end portions 78 of the assembly 28 fit into slot 80 of the assembly 40. In this position the lower edge of the opening 26 fits into a slot 82, best seen in FIG. 8, to capture the assembly 28. The U-shaped case 66 with the drive mounted therein is smaller than the opening 26, while the frame 74 is larger than the opening 26 and thus the frame 74 provides a stop position for the insertion of the assembly 26 into the slide assembly 40 as well as covering any space existing there between. The frame 74 thus allows an enlarged opening 26 for providing easy access by the operator to the fuses (not shown) of the auxiliary ports. In this inserted position the top 70 of case 66 fits under the depressed portion 56 of the leaf spring assembly 52 raising the L-shaped portion 60 up from the aperture 58 to thus capture the assembly 28 inside the slide casing assembly 40 by pressure of the spring assembly 52 on the drive retaining assembly 28 by maintaining the slot 82 in an interfering position with the bottom edge of the opening 26. To remove the assembly 28, the operator lifts the tab 76 to clear the interference between the slot 82 of the assembly 28 and the bottom edge of the opening 26 and withdraws the assembly 28 by pulling it forward to expose the wiring connections. These are then pulled apart to free the assembly 28 allowing it to be removed from the console 10. The above procedure is reversed to insert the assembly 28 into the console 10.

With the assembly 28 inserted into the console 10, the raised L-shaped portion 60 of the spring assembly 52 is placed along the top surface 70 to act as a natural stop limiting the door panel 18 from being inserted into the console 10 to a position where the operator could not grasp the lip section 20 to cover the front panel 22 by the door panel 18 when desired.

Certain obvious modifications and additions have been deleted herein for the sake of conciseness and readability but are intended to included into the scope of the following claims. As an example, floppy drive details are deleted since such details are well known. Similarly, the details of the internals of the auxiliary ports and their fusing is well known and these details are also deleted.

I claim:

1. A floppy drive mounting assembly for a computer allowing the insertion and removal of same from the computer by an operator without the use of tools comprising:

a computer;

a front panel having an opening therein and being fixably mounted to a face of said computer;

a slide casing assembly located proximately to the opening of said front panel;

a drive retaining assembly for affixing the floppy drive thereto so as to allow it to be inserted through the opening of said front panel into said slide casing assembly by sliding there along;

pressure means for retaining said drive retaining assembly within said slide casing assembly whenever said drive retaining assembly is slid into said slide casing assembly by the operator while allowing the drive retaining assembly to be removed by the operator without the use of any tools; and floppy drive door cover means for covering the floppy drive in one position and being slidable into said front panel opening to press against said pressure means in a second position with a part of said door cover means extending out from said front panel while exposing the floppy drive.

2. A floppy drive mounting assembly as set forth in claim 1 wherein said pressure means includes a spring assembly located on said slide casing assembly to press against said drive retaining assembly.

3. A floppy drive mounting assembly as set forth in claim 1 where said drive retaining assembly has a front frame larger than the opening of said front panel to limit the slidable travel of said drive retaining assembly into said slide casing assembly.

4. A floppy drive mounting assembly as set forth in claim 3 wherein said drive retaining assembly has an H shaped opening therein suitable for threading drive cables through to allow them to be tied with a cable retainer to said drive retaining assembly to strain relieve the cables thereby.

5. A floppy drive mounting assembly as set forth in claim 1 herein said slide casing assembly is formed as a open ended box having a pair of end flanges for mounting said slide casing assembly to said front panel proximate to the opening in said front panel and a pair of flanges located along the open end of the box for providing slide members allowing said drive retaining assembly to be slidably inserted into said slide casing assembly through the opening of said front panel.

6. A floppy drive mounting assembly for a computer allowing the insertion and removal of same from the computer by an operator without the use of tools comprising;

a computer;

a front panel having an opening therein and being fixably mounted to a face of said computer;

a slide casing assembly located proximate to the opening of said front panel;

a drive retaining assembly for affixing the floppy drive thereto so as to allow it to be inserted through the opening of said front panel into said slide casing assembly by sliding there along;

pressure means for retaining said drive retaining assembly within said slide casing assembly whenever said drive retaining assembly is slid into said slide casing assembly by the operator while allowing the drive retaining assembly to be removed by the operator without the use of any tools including a spring assembly located on said slide casing assembly to press against said drive retaining assembly; and a spring assembly located on said slide casing assembly to press against said drive retaining assembly and having a leaf spring assembly with a depressed portion extending through an aperture in said slide casing assembly to press against said drive retaining assembly thereby capturing said drive retaining assembly within said slide casing assembly whenever the drive retaining assembly is slid into the computer.

7. A floppy drive mounting assembly as set forth in claim 6 wherein said computer has a cover door for said front panel slidable into the computer in a section above said slide casing assembly.

8. A floppy drive mounting assembly as set forth in claim 7 wherein said leaf spring assembly has an L shaped end portion extending above said slide casing assembly when said drive retaining assembly is slid therein to form a stop for said cover door to prevent the full insertion of said cover door into the computer.

9. A floppy drive mounting assembly for a computer allowing the insertion and removal of same from the computer by an operator without the use of tools comprising;

a computer a front panel having an opening therein and being fixably mounted to a face of said computer;

a slide casing assembly located proximate to the opening of said front panel a drive retaining assembly for affixing the floppy drive thereto so as to allow it to be inserted through the opening of said front panel into said slide casing assembly by sliding there along;

pressure means for retaining said drive retaining assembly within said slide casing assembly whenever said drive retaining assembly is slid into said slide casing assembly by the operator while allowing the drive retaining assembly to be removed by the operator without the use of any tools;

said drive retaining assembly having a front frame larger than the opening of said front panel to limit the slidable travel of said drive retaining assembly into said slide casing assembly; and said drive mounting assembly having a slot located proximate to the front frame thereof large enough to fit over an edge of the opening of said front panel to hold said drive retaining assembly to the computer when said drive retaining assembly is fully inserted into said slide casing assembly with the slot locked over the front panel edge.

10. A floppy drive mounting assembly as set forth in claim 9 wherein the drive retaining assembly includes a tab for allowing the operator to lift the drive retaining assembly to allow the slot to clear the edge of the opening of said front panel to allow removal of said drive retaining assembly to allow the slot to clear the edge of the opening of said front panel to allow removal of said drive retaining assembly from the computer.

11. A removable floppy drive computer mounting assembly allowing easy auxiliary computer port fuse replacement by a computer operator comprising;

a computer having fused auxiliary ports located along a front panel thereof;

a removable floppy drive located along a front panel of the computer proximate to said auxiliary ports;

fuses for said auxiliary ports being located at the end of each port inside the computer;

an enlarged opening on said panel large enough to mount said removable floppy drive there through while allowing the operator to access said fuses whenever said removable floppy drive is removed by the operator;

a drive retaining assembly for affixing the floppy drive thereto having a frame and a slot proximate thereto for capturing an edge of the opening to retain the floppy drive inside the computer when said drive retaining assembly is inserted into the computer with the frame covering the enlarged opening; and a slide casing assembly mounted inside the computer proximate to said enlarged opening for sliding said drive retaining assembly therein.

12. A removable floppy drive computer mounting assembly allowing easy auxiliary computer port fuse replacement by a computer operator comprising;

a computer having fused auxiliary ports located along a front thereof;

a removable floppy drive located along a front panel of the computer proximate to said auxiliary ports;

fuses for said auxiliary ports being located at the end of each port inside the computer;

an enlarged opening on said panel large enough to mount said removable floppy drive there through while allowing the operator to access said fuses whenever said removable floppy drive is removed by the operator.

a slide casing assembly mounted inside the computer proximate to said enlarged opening for sliding said drive retaining assembly therein.

a door panel covering said removable floppy drive as well as said auxiliary ports and being rotatable away from said panel and being slidable into the computer from the rotated position to expose said removable floppy drive and auxiliary ports; and a spring assembly mounted on said slide casing assembly to apply pressure to said drive retaining assembly whenever it is inserted into said slide casing assembly and having an L shaped portion extending there from to act as a stop for said door panel whenever it is slid into the computer.

* * * * *